United States Patent
Manghi

(10) Patent No.: US 9,901,041 B2
(45) Date of Patent: Feb. 27, 2018

(54) PROTECTIVE DEVICE OF A DISPENSER SUPPLY HOSE AND RELATED FLUID FEEDING SYSTEM

(71) Applicant: IRRILAND S.R.L., San Giacomo Guastalla (Reggio Emilia) (IT)

(72) Inventor: Claudio Manghi, Bagnolo in Piano (IT)

(73) Assignee: IRRILAND S.R.L., San Giacomo Guastalla (IT)

( * ) Notice: Subject to any disclaimer, the term of this patent is extended or adjusted under 35 U.S.C. 154(b) by 0 days.

(21) Appl. No.: 15/017,254

(22) Filed: Feb. 5, 2016

(65) Prior Publication Data

US 2016/0235019 A1    Aug. 18, 2016

(30) Foreign Application Priority Data

Feb. 16, 2015  (IT) .............................. MO2015A0027

(51) Int. Cl.
*A01G 25/00* (2006.01)
*A01G 25/09* (2006.01)
*B65H 75/40* (2006.01)

(52) U.S. Cl.
CPC ......... *A01G 25/095* (2013.01); *B65H 75/403* (2013.01)

(58) Field of Classification Search
CPC .. A01G 13/0287; A01G 25/09; A01G 25/095; A63C 19/12; B65H 75/403
USPC .................................................. 242/390, 391
See application file for complete search history.

(56) References Cited

U.S. PATENT DOCUMENTS

| | | | | |
|---|---|---|---|---|
| 3,473,755 A | * | 10/1969 | Brown ................... | A63C 19/12 242/391 |
| 4,253,619 A | * | 3/1981 | Corderoy ............... | A01G 25/09 242/390.6 |
| 4,632,329 A | * | 12/1986 | Burley ................... | A63C 19/12 104/136 |
| 4,756,260 A | | 7/1988 | Petersen | |
| 4,832,263 A | * | 5/1989 | Poynor ................ | A01G 25/095 239/197 |
| 5,095,576 A | * | 3/1992 | Galigan .................. | A47L 9/248 15/246.2 |
| 6,299,094 B1 | * | 10/2001 | James, Jr. .......... | A01G 13/0287 242/390 |

FOREIGN PATENT DOCUMENTS

CN         2588756 Y     12/2003

* cited by examiner

*Primary Examiner* — Viet Le
(74) *Attorney, Agent, or Firm* — Pearne & Gordon LLP

(57) ABSTRACT

A protective device of a dispenser supply hose comprising a trolley (4) which is movable on a soil (200) to be irrigated, which trolley (4) can be associated with a supply hose (2) of a fluid (100); said device further comprises a protective element (9) intended for said supply hose (2), which protective element (9) is interposed between the soil (200) and said supply hose (2), and accumulating means (8) of the protective element (9) suitable for extending said protective element (9) during an extension step of said supply hose (2) and to recover said protective element (9) from said soil (200) during a recovery step of said supply hose (2).

16 Claims, 5 Drawing Sheets

PROTECTIVE DEVICE OF A DISPENSER SUPPLY HOSE AND RELATED FLUID FEEDING SYSTEM

The invention relates to a protective device of a dispenser supply hose.

It is a further object of the present invention a fluid feeding system provided with said protective device.

The invention finds application in the field of agriculture and forestry and in all those sectors wherein irrigation via a fluid is required.

By fluid it is meant water, sewage, animal waste and wastewater from the central bioenergy.

Within the agricultural field, irrigation systems are known which comprise a winding-reel of a fluid supply hose, which supply hose is connected to a dispenser.

The dispenser is fitted aboard a trolley which is being moved on the soil to be irrigated. The winding-reel and the trolley carrying the dispenser are generally arranged opposite to one another. In other words, while the winding-reel is arranged on a side of the soil to be irrigated, the trolley is fitted aboard the dispenser which is initially arranged on the side opposite to that where the winding-reel is situated.

As the irrigation cycle proceeds, the trolley is drawn towards the winding-reel for moving along the soil to be irrigated.

Thus, a preparatory step as well as an operational step are provided within a soil watering cycle.

During the preparatory step, both the winding-reel and the trolley are positioned. During this step, the trolley is arranged in a position opposite to that of the winding-reel via an agricultural tractor. In other words the agricultural tractor causes the trolley to move from a starting end (where the winding-reel of the hose is placed), up to the opposite end of the soil to be treated. This towing step of the trolley further involves unwinding of the supply hose initially wound on the winding reel.

In the operational step of the feeding system the trolley is gradually recovered by the winding-reel, which winding-reel becomes wound on itself so that the dispenser may start wetting the soil to be irrigated.

Thus, during the preparatory step, the trolley and the dispenser are operated via the agricultural tractor which provides to tow them, whereas during the operational step, the trolley and the dispenser are recovered via rewinding of the supply hose on the winding reel.

It is known that irrigation systems as the one disclosed above by way of example, exhibit some drawbacks often affecting the supply hose, which drawbacks generally result in serious complications such as rupture of the supply hose with consequent dispersion of water in pressure.

A first drawback is due to the fact that during irrigation the supply hose is subject to damage, when not to complete rupture, because of an excessive friction occurring between the supply hose in its stretched condition and the soil. The friction between the hose and the soil particularly depends on the type of crop as well as on the type of soil. Indeed, on farmlands with low-stem plants, such as for example potatoes or beet and the like, in the case where the field was cultivated with non-irrigated forage immediately after mowing operations, between the outer wall of the supply hose and the leaves of the plants, there is generated a high friction such that the supply hose becomes subject to a localized and concentrated traction often resulting in rupture of the supply hose. Hence, irrigation on lands farmed with low-stem plants which are rich in leaves, leads to mechanical stress of the supply hose.

A further aspect which determines drawbacks within the irrigation systems of the prior art is related to the very nature of the soil, indeed according to the geographical position of the farmland, for example an agricultural plain area rather than an agricultural mountain area, wherein the terrain is smoother and dustier, a different amount of clay and/or sand is likely to be found.

Where a high sand quantity is present in the soil, this results in a premature wear of the outer surface of the supply hose due to permanent abrasion exerted by the sand on the hose. This abrasion subsequently results in a thinning of the hose thickness to the detriment of the fluid mechanical seal to the pressure, with consequent rupture of the hose itself.

Where the soil is clayey, the situation further deteriorates in the event of rain due to which a very strong adhesion, almost a gluing of the hose to the soil occurs.

The friction resulting from the hose being towed on the ground, then causes dragging of the machine and in some cases even tipping thereof, with consequent loss of stabilization.

Because of friction, mechanical failure of transmission organs or structural ruptures of the hose winding-reel may also occur.

It is an object of the present invention to provide a protective device able to overcome the drawbacks encountered in the known art as above disclosed. Thus, aim of the present invention is to provide a protective device of a dispenser supply hose owing to which reliability and robustness of the supply hose can be improved.

The above and other aims are substantially attained by a protective device in accordance with what is disclosed in one or more of the appended claims.

Further characteristics and advantages will become more apparent from the detailed description of several non-exclusive embodiments of a protective device according to the present invention. Dependent claims correspond to possible embodiments of the invention.

Such a description is provided with reference to the appended figures, which are also provided as a non-limiting example, wherein.

Figure 1:
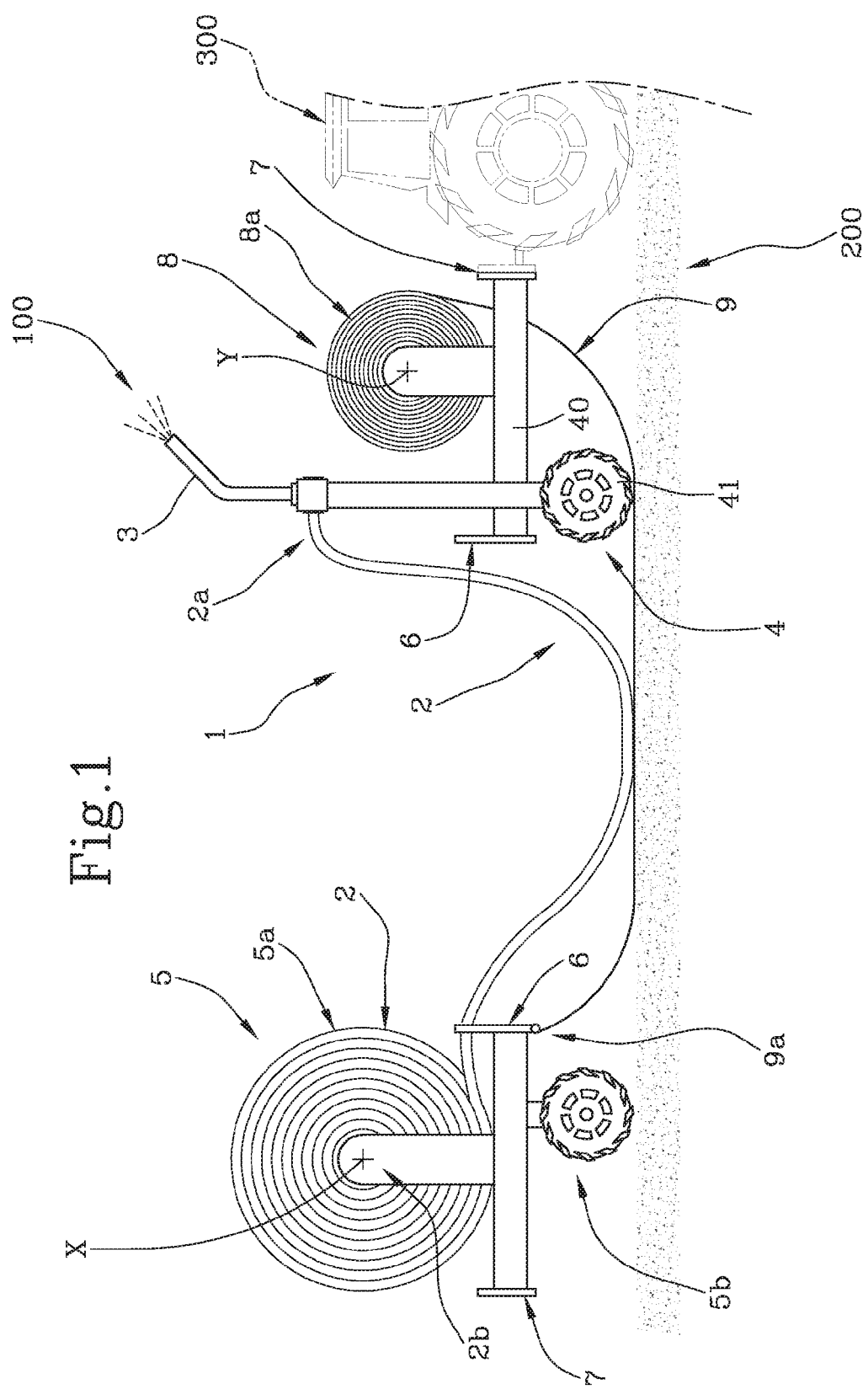
FIG. 1 is a schematic view of a fluid feeding system provided with a protective device according to the present invention in an operative use configuration.

In reference to the appended figures, by the numeral 1 it is generally signified the protective device of a dispenser supply hose in accordance with the present invention.

The protective device 1 comprises at least one trolley 4 of the substantially known type, which is provided with a frame 40 and a plurality of wheels 41 for allowing movement of the trolley 4 on a soil 200 to be irrigated.

Said trolley 4 can be associated to a dispenser 3, the latter being connected to a supply hose 2 provided with a first end 2a, which is in turn connected to the dispenser 3, and a second end 2b spaced apart from the trolley 4 and thus from the dispenser 3.

The dispenser 3 can be equally a sprinkler, an irrigation bar also known as wing rain, an under-canopy sprinkler or an above-canopy sprinkler or a sewage dispenser.

The dispenser 3 comprises a dispensing nozzle for spraying fluid 100, water, sewage, animal waste and effluents, originating from bio-energy power plants, through which dispensing nozzle the fluid is spread evenly over an almost semi-circular area.

The dispenser 3 can be positioned at a distance from a second end 2b of the supply hose 2 in an extension configuration of the supply hose 2. In other words, the dispenser 3 can be positioned at a distance from the first end 2a of the supply hose 2 which is at most equal to the overall length of the hose 2 itself. Preferably, the second end 2b of the hose 2 is connected with a water source such as a well or a supply channel or an aqueduct.

Said second end 2b may be connected to a hose-reel 5 of the supply hose 2. At the second end 2b, the supply hose 2 may indeed be wound on the hose-reel 5 or kept free and wound on itself. Since most of the irrigation systems further provide use of a hose-reel 5, reference shall be made thereto hereinafter.

The hose-reel 5 is configured to allow the supply hose 2 to be extended in conjunction with a translational movement of the trolley 4 which is moving away from the hose-reel 5, and to allow the supply hose 2 to be recovered in conjunction with a translational movement of the dispenser 3 towards the hose-reel 5.

Preferably, the hose-reel 5 comprises a second winding-reel 5a of the supply hose 2. Preferably, the hose-reel 5 further comprises support means 5b, suitable for supporting the second winding-reel 5a and allowing rotation thereof about an axis "X", which axis "X" is substantially horizontal in a use configuration of the dispenser 3. In addition, the support means 5b are configured for transporting both the dispenser 3 and the trolley 4 even at long distance, such as for example when the same are being transferred from a warehouse following non-use periods, to a farmland 200 to be irrigated. The support means particularly comprises coupling means 5b schematically shown in the appended figures by the reference 6, which coupling means 5b is suitable for coupling the trolley 4 and the hose-reel 5, so that a single transportation thereof is allowed via a motorized vehicle 300 such as an agricultural tractor or the like.

In accordance with the inventive concept of the present invention, the protective device 1 is configured for operating alternately between an extension configuration of the supply hose 2 and a recovery configuration of the supply hose 2.

In particular, the extension configuration of the supply hose 2 takes place when the first end 2a is moving away from the second end 2b, whilst the recovery configuration of the supply hose 2 occurs when the first end 2a is moving towards the second end 2b of the supply hose 2.

In both operational configurations of the device there is provided flowing of water through the supply hose 2, i.e. both if the supply hose 2 is being gradually extended or wound on the second winding-reel 5a.

In particular, in an extension configuration of the supply hose 2, the trolley 4 and the dispenser 3 fitted thereon are transportable to a pre-determined maximum distance with respect to the hose-reel 5, which distance is preferably determined by the complete unwinding of the hose 2 from the second winding reel 5a.

Conversely, in a recovery configuration of the supply hose 2, the trolley 4 and the dispenser 3 fitted thereon are brought back to the initial position at the hose-reel 5, preferably with the supply hose 2 being recovered on the second reel winding 5a.

In detail, the second winding reel 5a is configured for rotating idly about the axis "X", so as to allow extension of the irrigation hose 2 in the extension configuration of the supply hose 2 via motorized means 300, which motorized means 300 is suitable for towing the trolley 4 and for rotating in the opposite direction in order that the supply hose 2 can be recovered through an external power source (not illustrated in the appended figures).

By way of non-limiting example, the external power source may comprise a mechanical power socket connected to a power output of an agricultural tractor, or the external power source may comprise an electrical or endothermic engine which is suitable for causing the second winding-reel 5a to rotate, which electrical or endothermic engine is mounted exactly on the hose-reel 5.

In accordance with the present invention, the protective device 1 comprises accumulating means 8 of a protective element 9 for the supply hose 2, which accumulating means 8 is associated with the trolley 4 in an operative use configuration of the dispenser 1.

Advantageously, the accumulating means 8 are configured for interposing the protective element 9 between the soil 200 and the irrigation hose 2 in the extension configuration of the supply hose 2, in order that the protective element 9 is collected from the soil 200 in a recovery configuration of the supply hose 2.

In other words, the supply hose 2 in a use operational configuration of the dispenser 1 is always resting on the protective element 9, which in turn is lying on the soil 200 which is being irrigated.

Advantageously, the supply hose 2, in conjunction with its operating unwinding and recovery configurations on the second winding-reel 5a, is not in contact with the soil 200, nor with the plants growing in the soil. By way of example, the appended FIG. 1 illustrates schematically the protective device 1 of the present invention in the extension configuration of the supply hose 2 in conjunction with which the hose 2 is resting on the soil 200 only after that the protective element 9 was laid thereon.

In particular, the protective element 9 is of the flexible type so that it can be unwound and collected by the accumulating means 8 respectively in the extension configuration of the supply hose 2 and in the recovery configuration of the supply hose 2 without any jamming taking place.

Preferably the protective element 9 is of the flexible and wind-up ribbon-like type. By way of non-limiting example, the protective element 9 is a plastic strip or a woven mesh made of plastic material, e.g. PP or PE or it can be a cloth made of a non-woven-fabric. Preferably, the accumulating means 8 of the protective element 9 comprises a first winding-reel 8a of the protective element 9, as shown schematically in the appended figures. The first winding-reel 8a of the protective element 9 is rotatable about an axis "Y" which is substantially horizontal so that the protective element 9 can be extended/collected in a tangent position to the soil 200.

The first winding-reel 8a is configured for idly rotating about the axis "Y" so as to allow the protective element 9 to be extended in the extension configuration of the supply hose 2, and for rotating about the axis "Y" in opposite direction in order to allow the protective element 9 to be recovered in the recovery configuration of the supply hose 2 via a power source 10 of the extension and collecting means 8. The power source 10 will be better disclosed in a later section.

In particular, a free end 9a of the protective element 9 is constrained at the second winding-reel 5a of the hose 2 so that a counter-acting force is generated which allows unwinding of the protective element 9 in the unwinding configuration of the same, as well as extension of the supply hose 2. Preferably the free end 9a of the protective element 9 is constrained directly to a portion of the support means 5b, as shown by way of example in FIG. 1 attached hereto. The free end 9a of the protective element may further be constrained to the ground by means of a peg 200 (not shown), or the like. Preferably, in an unwinding configuration of the protective element 9 and in an extension configuration of the supply hose 2, the second winding-reel 5a of the hose 2 and the first winding-reel 8a of the protective element 9 respectively rotate idle about the axis "X" and "Y" via a translational movement of the trolley 4 which is moving away from the hose-reel 5, i.e. via a translational movement of the first end 2a connected to the dispenser 3, which first end 2a performs a movement away from the second end 2b connected to the hose-reel 5 of the supply hose 2.

The accumulating means 8 of the protective element 9 comprises at least one accompanying drum 8b configured to rotate according to a winding direction of the protective element 9 about the first winding-reel 8a in the accumulating configuration of the irrigation hose 2. Preferably, the accumulating means 8 comprises a pair of accompanying drums 8b, still more preferably the accompanying drums 8b are rotatable brush drums with rotation direction opposite to the winding direction of the accumulating means 8.

Advantageously, the accompanying brush drums 8b are suitable for promoting correct positioning of the protective element 9, especially when the protective element 9 is being wound on the first winding-reel 8a; the brush drums 8b further allow removal of any sand deposits, debris, leaves or grass from the protective element 9, which remained deposited thereon after that the latter was stretched on the soil 200.

Figure 5:
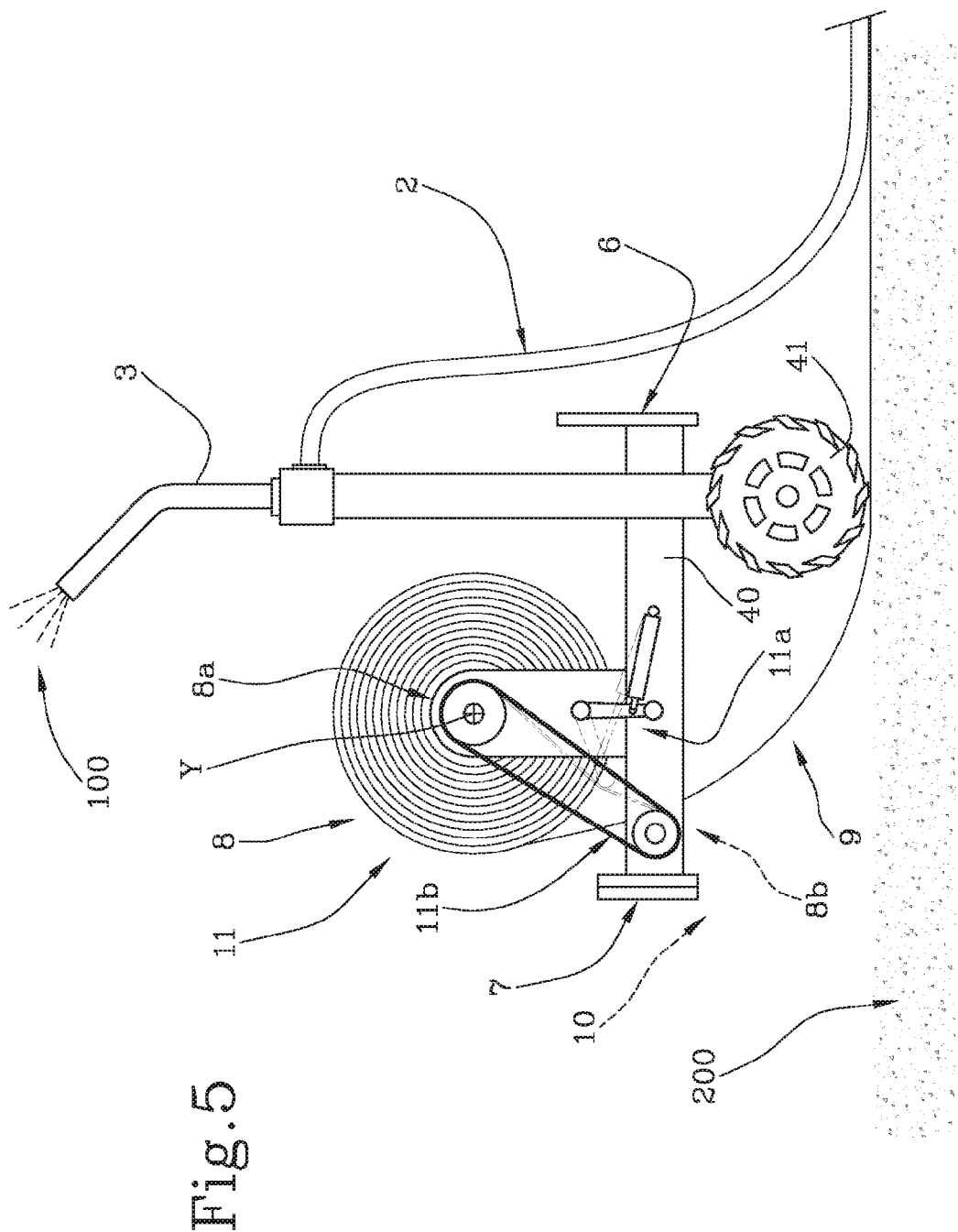
FIG. 5 is a schematic view of a further detail of the protective device shown in FIG. 1 according to the present invention.

With reference now to the appended FIG. 5, the protective device 1 comprises an enabling element 11, which is so configured as to reversibly select rotation of the first winding-reel 8a between an idle rotation, corresponding to the extension configuration of the irrigation hose 2, and a driven rotation through which the protective element 9 is recovered in conjunction with the recovery configuration of the irrigation hose 2.

The enabling element 11 comprises a pulley 11a which is reversibly movable between an engaged position (dotted line in the illustration of FIG. 5), and a disengaged position (solid line in the illustration of FIG. 5), wherein the pulley 11a in the engaged position thereof is engaging and stretching a belt 11b, which belt 11b is predisposed for a mechanical transmission between the power source 10 and the first winding-reel 8a; in this manner the protective element 9 is allowed to be recovered in conjunction with the recovery configuration of the irrigation hose 2.

In other words, the enabling element 11 is operable in a use configuration of the dispenser 1 for converting the idle rotation of the second winding-reel 5a of the supply hose 2 and the first winding-reel 8a of the protective element 9, in conjunction with the stretching configuration of the protective element 9 and the extension configuration of the supply hose 2, into a driven rotation of the second winding-reel 5a of the supply hose 2 and the first winding-reel 8a of the protective element 9 by means of different systems better detailed in a later section.

Preferably, the pulley 11a is reversibly movable via an electro-mechanical actuator. In one embodiment of the present invention, not illustrated in the appended figures, the device 1 comprises a rechargeable battery adapted to power the electro-mechanical actuator in which said battery is rechargeable via a photovoltaic panel or an electrical generator driven by a hydraulic turbine.

Figure 2:
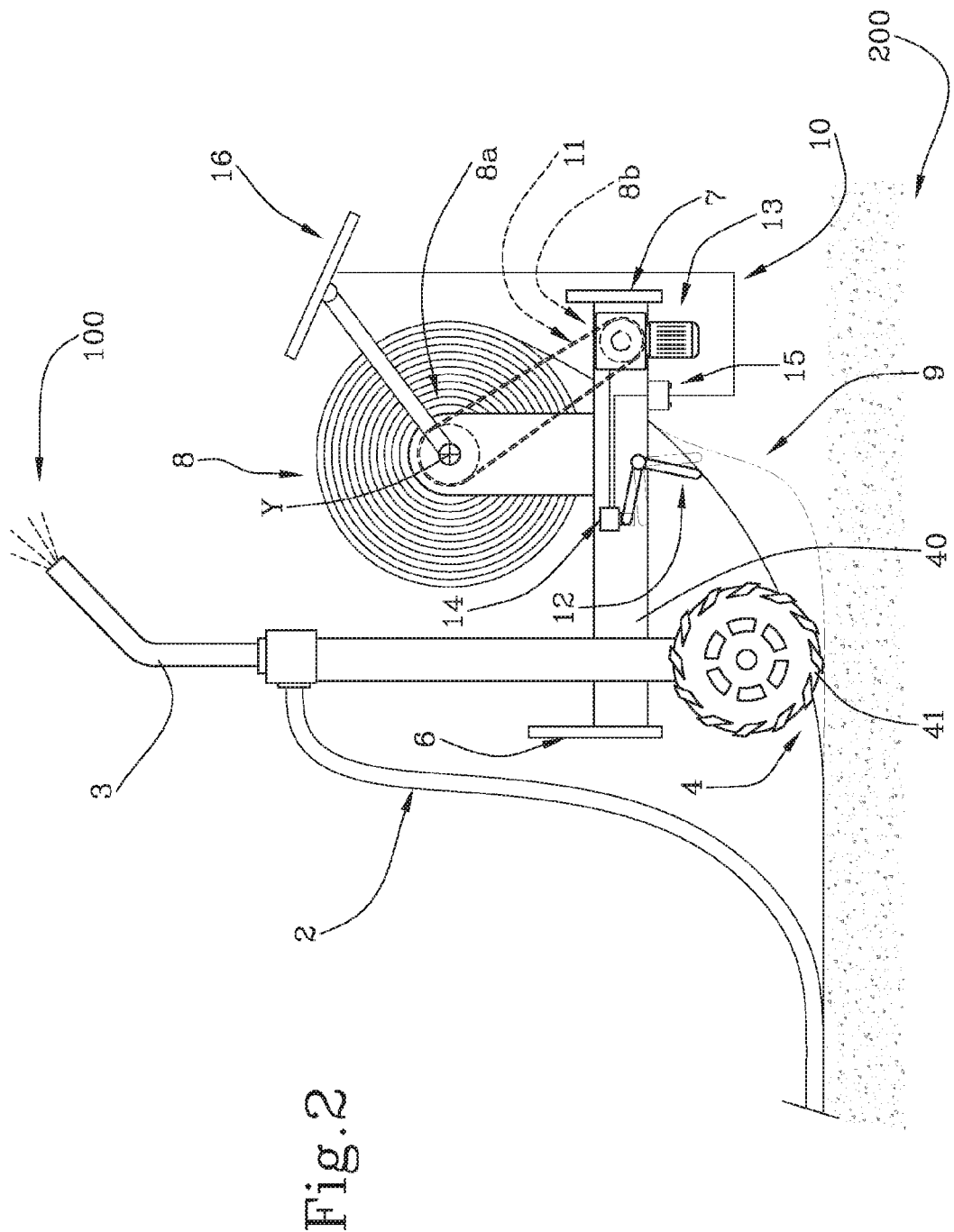
FIG. 2 is a schematic view of a detail of the protective device illustrated in FIG. 1 according to the present invention in one embodiment thereof.
Figure 3:
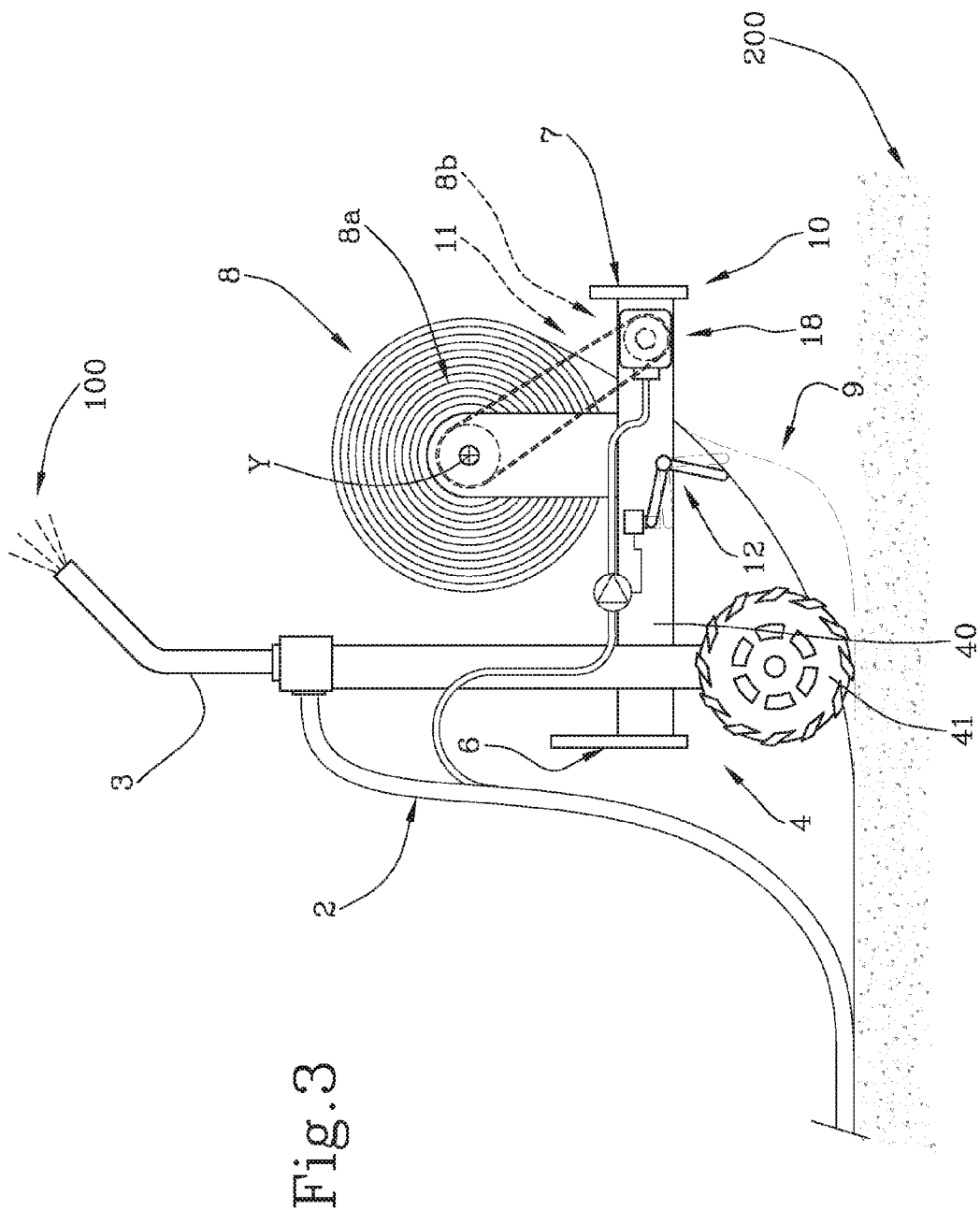
FIG. 3 is a schematic view of a detail of the protective device illustrated in FIG. 1 according to the present invention in a further embodiment thereof.

In accordance with an embodiment illustrated schematically in FIGS. 2 and 3, the device 1 comprises accumulating means 8, which in turn comprises a power source 10 of the electronic or electro-hydraulic type. Preferably, the power source 10 of the electronic or electro-hydraulic type is configured to exploit respectively electricity or pressure, and flow rate of a fluid 100 in order that the accumulating means 8 can be activated.

With particular reference to FIGS. 2 and 3, the accumulating means 8 of the protective element 9 comprises an oscillating lever 12 in a reversible manner, which lever 12 is operatively associated with the power source 10 of the electronic or electro-hydraulic type.

The oscillating lever 12 is configured for being arranged between a first position reachable by its own weight, so that the accumulating means 8 are activated in a loosening condition between the first winding-reel 8a and the protective element 9—see dotted line in the appended FIGS. 2 and 3—and a second position reachable via a lateral thrust imparted by the protective element 9 which is stretched so that the accumulating means 8 are not activated in a stretching condition between the first winding-reel 8a and the protective element 9—see continuous line in the illustrations of FIGS. 2 and 3 annexed hereto.

In other words, when the winding speed of the protective element 9 is not equal and/or synchronized to the speed of the translational forward movement based on which the trolley 4 is moving towards the hose-reel 5, the oscillating lever 12 activates the power source 10, which in turn sets in rotation the first winding-reel 8a so that the excess of the protective element 9 can be recovered, which tends to protrude relative to the trolley 4 due to a poor winding tension. In conjunction with a correct winding tension of the protective element 9 around the first winding-reel 8a, the oscillating lever 12 becomes subject to a lateral displacement which allows deactivation of the power source 10.

With particular reference now to FIG. 2 attached thereto, in accordance with the present invention, it is illustrated an embodiment of the device 1 comprising a power source 10 of the electronic type, which comprises an electric motor associated with the first winding-reel 8a and a micro switch 14 operatively associated with a profiled end of the oscillating lever 12. The micro switch 14 is switched to a closed state by means of the oscillating lever 12 in the first position and switched to an open state by means of the oscillating lever 12 in the second position.

Preferably, the electric engine 13 is powered by a rechargeable battery 15 through a photovoltaic panel 16.

With particular reference now to FIG. 3 attached thereto, in accordance with the present invention, there is illustrated a further embodiment of the dispenser 1 comprising a power source 10 of the electro-hydraulic type which includes a hydraulic valve 17 operatively associated at one end of the oscillating lever 12. The hydraulic valve 17 is switched to an open state with the oscillating lever 12 being in the first position, and to a closed state with the oscillating lever 12 being in the second position thereof.

The hydraulic valve 17 is in fluid connection with a hydraulic turbine 18 which is mechanically connected to the first winding-reel 8a in such a manner that a mechanical torque, generated by the hydraulic turbine 18, is transmitted to the first winding-reel 8a, so that winding of the protective element 9 is allowed. Preferably, the hydraulic turbine 18 is mechanically connected to the enabling element 11 and the latter to the first winding-reel 8a.

Preferably, the hydraulic valve 17 is configured for withdrawing the fluid 100 from the irrigation hose 2 in proximity of the dispenser 3.

Figure 4:
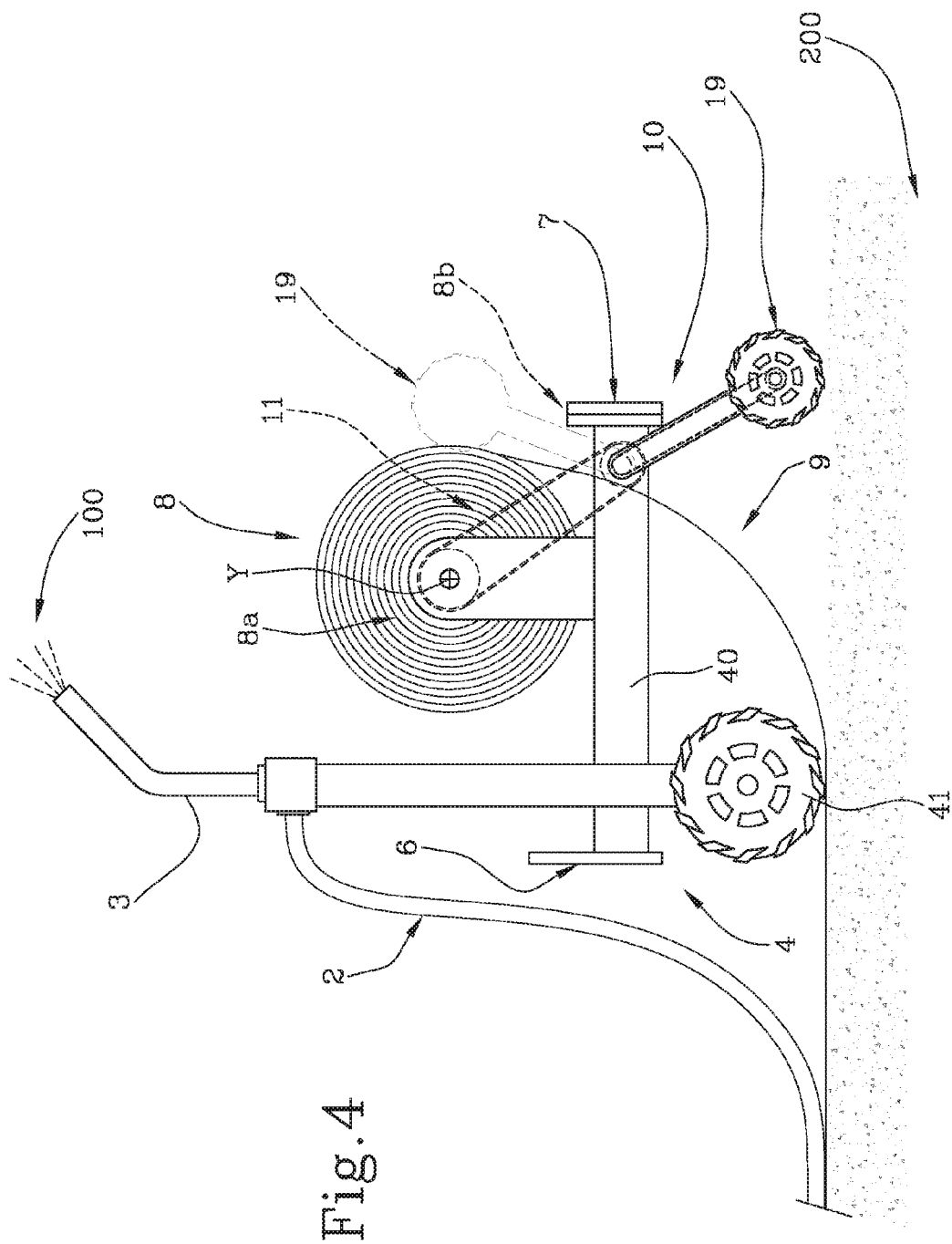
FIG. 4 is a schematic view of a detail of the protective device illustrated in FIG. 1 according to the present invention in a further and different embodiment thereof.

With particular reference now to FIG. 4 attached thereto, in accordance with the present invention, the dispenser 1 is illustrated, which comprises a power source 10 of the mechanical type. Preferably, the power source 10 of the mechanical type is configured to draw power from the translational forward movement of the trolley 4 towards the accumulation device 5.

The power source 10 of the mechanical type particularly comprises a mechanical connection between a free end of the first winding-reel 8a and a drive wheel 19, which is configurable between a contact position with the soil 200 and a rotatable position—shown schematically by the continuous line of the appended FIG. 4—for converting the translational forward movement of the trolley 4 into mechanical power in order that the first winding-reel 8a is set in rotation, and a raised and non-active position, as shown schematically by the dotted line of FIG. 4 herewith annexed.

Preferably, the mechanical connection between a free end of the first winding-reel 8a and the drive wheel 19 is a flexible chain or belt mechanical transmission.

The present invention has attained the set aims.

Advantageously, the protective device allows stretching and winding of the supply hose, wherein the supply hose is maintained in a state of cleanliness suitable for ensuring greater reliability as well as a better service life than the prior art.

Owing to use of a hose protective element, which completely separates the hose from the soil and the cultivated plants, the protective device of the present invention advantageously allows winding and stretching of the supply hose without any necking and/or excessive friction being formed due to contact with the soil or the foliage of cultivated plants, even when the soil or the foliage are wet.

Owing to the protective element which isolates consistently the irrigation hose from the bearing surface, the device of the present invention advantageously allows to effectively irrigate any type of soil, regardless if sandy, clayey, dusty or stony.

The protective device of the present invention advantageously allows to protect the supply hose with the aid of means partially or completely independent from an external power source, thereby resulting use of the dispenser simple, efficient and cost-effective. Advantageously, the protective device of the present invention improves smoothness of the hose on the soil, thereby promoting a reduced waste of energy of the fluid feeding system during rewinding of the supply hose, as well as an under-sizing of the driving means fitted aboard the hose-reel.

The invention claimed is:

1. A protective device of a dispenser supply hose comprising:
   a first trolley (4), movable on a soil (200) to be irrigated, which can be associated with a supply hose (2) of a fluid (100) exhibiting a first end (2a) connected to a dispenser (3), which can be associated aboard the first trolley (4), and a second end (2b) which is stationary and not connected to the first trolley (4);
   wherein said protective device comprises:
   a protective element (9) for said supply hose (2) interposed between the soil (200) and said supply hose (2);
   accumulating means (8) of the protective element (9) adapted to stretch said protective element (9) during an extension step of said supply hose (2), said extension being defined by a movement of the first trolley (4), wherein the first end (2a) of the hose is moving away from the second end (2b) of the hose, said accumulating means (8) being further suitable for recovering said protective element (9) from said soil (200) during a recovery step of said supply hose (2), said recovery step being defined by a movement of the first trolley (4), wherein the first end (2a) is moving towards the second end (2b) of the hose; said protective element (9) is of the flexible type such as to be extended and collected by said accumulating means (8) respectively in the extension step of the supply hose (2) and in the recovery step of said supply hose (2); wherein said accumulating means (8) comprises a first winding-reel (8a) of said protective element (9), said first winding-reel (8a) being so configured as to rotate idly in order to allow said protective element (9) to be stretched in conjunction with the extension step of the supply hose (2), and to rotate in the opposite direction in order to promote recovery of said protective element (9) during the recovery step of the supply hose (2) via a power source (10) belonging to said accumulating means (8) and suitable for promoting rotation of said first winding-reel (8a) and wherein said accumulating means (8) of said protective element (9) comprises at least one accompanying drum (8b) configured for rotating opposite the rotation direction of the first winding-reel (8a) during the extension step of the supply hose (2).

2. A device (1) according to claim 1, comprising an actuating element (11) configured to reversibly select the rotation of said first winding-reel (8a) between a neutral rotation, aimed at promoting suitable arrangement of said protective element (9) in conjunction with the extension step of the supply hose (2), and a driven rotation, aimed at promoting suitable arrangement of said protective element (9) during the recovery step of the supply hose (2).

3. A device (1) according to claim 2, wherein said actuating element (11) comprises a pulley (11a), which is reversibly movable between an engaged position, wherein said pulley (11a) is engaging and stretching a belt (11b), which belt (11b) is predisposed for a mechanical drive between said power source (10) and said first winding-reel (8a), thereby enabling said protective element (9) to be recovered in conjunction with the recovery step of said supply hose (2), and a disengaged position, wherein said pulley (11a) is disengaging said belt (11b) by making said first winding-reel (8a) rotatably neutral, thus allowing the protective element (9) to be arranged in the extension configuration in conjunction with the extension configuration of the supply hose (2), said extension step of the supply hose (2) being performed by a driving means (300) which is suitable for towing said first trolley (4) on the soil (200), thereby causing the first winding-reel (8a) to rotate.

4. A device (1) according to claim 1, wherein said accumulating means (8) comprises a power source (10) of the mechanical type, said power source (10) being configured for reeling or rotational power when the first end (2a) of the supply hose (2) is moving toward the second end (2b) thereof.

5. A device (1) according to claim 4, wherein said accumulating means (8) comprises a first winding-reel (8a) of said protective element (9) and wherein said power source

(10) comprises a mechanical connection between a free end of said first winding-reel (8a) and a drive wheel (19), which is configurable between a contact position with said soil (200) and rotatable for converting said translational forward movement of said ends (2a, 2b) of the supply hose (2) into a mechanical power, which mechanical power sets in rotation said second winding-reel (8a), and a raised and non-active position.

6. The device (1) according to claim 5, wherein the mechanical connection is a flexible chain or belt mechanical transmission.

7. A device (1) according to claim 1, wherein said accumulating means (8) comprises a power source (10) of the electronic or electro-hydraulic type, said power source (10) of the electronic or electro-hydraulic type being configured to exploit respectively electricity or pressure, and flow rate of a fluid (100) in order that said accumulating means (8) are activated.

8. A device (1) according to claim 7, wherein said accumulating means (8) comprises a first winding-reel (8a) of said protective element (9) and a lever (12), operatively associated with said power source (10) of the electronic or electro-hydraulic type, said lever (12) being oscillating between a first position reachable by its own weight in order that said accumulating means (8) may be activated under a loosening condition between said first winding-reel (8a) and said protective element (9), and a second position attainable by a lateral thrust imparted by said protective element (9) in its stretching condition in order that said accumulating means (8) are not activated under a stretching condition between said second winding-reel (8a) and said protective element (9).

9. A device (1) according to claim 8, wherein said power source (10) of the electronic type comprises an electric motor (13) associated with said first winding-reel (8a) and a micro switch (14) operatively associated with a shaped end of said oscillating lever (12), wherein said micro switch (14) is switched to a close state via said oscillating lever (12) in said first position, and switched to an open state via said oscillating lever (12) in said second position.

10. A device (1) according to claim 9, wherein said power source (10) of the electro-hydraulic type comprises a hydraulic valve (17) which is operatively associated to an end of said oscillating lever (12), wherein said valve (17) is switched to an open state via said oscillating lever (12) in said first position, and switched to a close state via said oscillating lever (12) in said second position, said hydraulic valve (17) being in fluid connection with a hydraulic turbine (18) mechanically connected with said first winding-reel (8a).

11. The device (1) according to claim 10, wherein the valve (17) is configured for collecting said fluid (100) from said supply hose (2).

12. The device (1) according to claim 9, wherein the electric engine (13) is fed by a rechargeable battery (15) via a photovoltaic panel (16).

13. The device (1) accordingly to claim 1, wherein the at least one accompanying drum (8b) is a brush drum.

14. An irrigation system of the type includes:
a supply hose (2) of a fluid (100) comprising a first end (2a) and a second end (2b);
a hose reel (5) for supporting said supply hose (2) comprising a second winding-reel (5a) connected to the supply hose (2) at the second end (2b) thereof; said second winding-reel (5) being rotatingly operating about an axis (X) between an unwinding step, wherein the supply hose (2) is being unwound with the first end (2a) thereof moving away from the second end (2b), and a winding step, wherein the supply hose (2) is being re-wound on the second winding-reel (5), thereby causing the first end (2a) thereof to move toward the second end (2b);
a dispenser (3) hydraulically connected to the first end (2a) of the supply hose (2) for dispensing a fluid (100) on a foil (200);
a second trolley (6) which is suitable for carrying on board the dispenser (3), the second trolley (6) being movable on the soil (200) by performing a movement away from the hose-reel (5) during the unwinding step of the supply hose (2), and a movement towards the hose-reel during the winding step of the supply hose (2);
characterized in that it comprises a protective device (1) of the supply hose (2) made according to claim 1.

15. A protective device of a dispenser supply hose comprising:
a first trolley (4), movable on a soil (200) to be irrigated, which can be associated with a supply hose (2) of a fluid (100) exhibiting a first end (2a) connected to a dispenser (3), which can be associated aboard the first trolley (4), and a second end (2b) which is stationary and not connected to the first trolley (4);
wherein said protective device comprises:
a protective element (9) for said supply hose (2) interposed between the soil (200) and said supply hose (2);
accumulating means (8) of the protective element (9) adapted to stretch said protective element (9) during an extension step of said supply hose (2), said extension being defined by a movement of the first trolley (4), wherein the first end (2a) of the hose is moving away from the second end (2b) of the hose, said accumulating means (8) being further suitable for recovering said protective element (9) from said soil (200) during a recovery step of said supply hose (2), said recovery step being defined by a movement of the first trolley (4), wherein the first end (2a) is moving towards the second end (2b) of the hose; said protective element (9) is of the flexible type such as to be extended and collected by said accumulating means (8) respectively in the extension step of the supply hose (2) and in the recovery step of said supply hose (2), wherein said accumulating means (8) comprises a power source (10) of the mechanical type, said power source (10) being configured for reeling or rotational power when the first end (2a) of the supply hose (2) is moving toward the second end (2b) thereof and wherein said accumulating means (8) comprises a first winding-reel (8a) of said protective element (9) and wherein said power source (10) comprises a mechanical connection between a free end of said first winding-reel (8a) and a drive wheel (19), which is configurable between a contact position with said soil (200) and rotatable for converting said translational forward movement of said ends (2a, 2b) of the supply hose (2) into a mechanical power, which mechanical power sets in rotation said second winding-reel (8a), and a raised and non-active position.

16. A protective device of a dispenser supply hose comprising:
a first trolley (4), movable on a soil (200) to be irrigated, which can be associated with a supply hose (2) of a fluid (100) exhibiting a first end (2a) connected to a dispenser (3), which can be associated aboard the first trolley (4), and a second end (2b) which is stationary and not connected to the first trolley (4);
wherein said protective device comprises:

a protective element (9) for said supply hose (2) interposed between the soil (200) and said supply hose (2);
accumulating means (8) of the protective element (9) adapted to stretch said protective element (9) during an extension step of said supply hose (2), said extension being defined by a movement of the first trolley (4), wherein the first end (2a) of the hose is moving away from the second end (2b) of the hose, said accumulating means (8) being further suitable for recovering said protective element (9) from said soil (200) during a recovery step of said supply hose (2), said recovery step being defined by a movement of the first trolley (4), wherein the first end (2a) is moving towards the second end (2b) of the hose; said protective element (9) is of the flexible type such as to be extended and collected by said accumulating means (8) respectively in the extension step of the supply hose (2) and in the recovery step of said supply hose (2), wherein said accumulating means (8) comprises a power source (10) of the electronic or electro-hydraulic type, said power source (10) of the electronic or electro-hydraulic type being configured to exploit respectively electricity or pressure, and flow rate of a fluid (100) in order that said accumulating means (8) are activated and wherein said accumulating means (8) comprises a first winding-reel (8a) of said protective element (9) and a lever (12), operatively associated with said power source (10) of the electronic or electro-hydraulic type, said lever (12) being oscillating between a first position reachable by its own weight in order that said accumulating means (8) may be activated under a loosening condition between said first winding-reel (8a) and said protective element (9), and a second position attainable by a lateral thrust imparted by said protective element (9) in its stretching condition in order that said accumulating means (8) are not activated under a stretching condition between said second winding-reel (8a) and said protective element (9).

* * * * *